Figure 1:
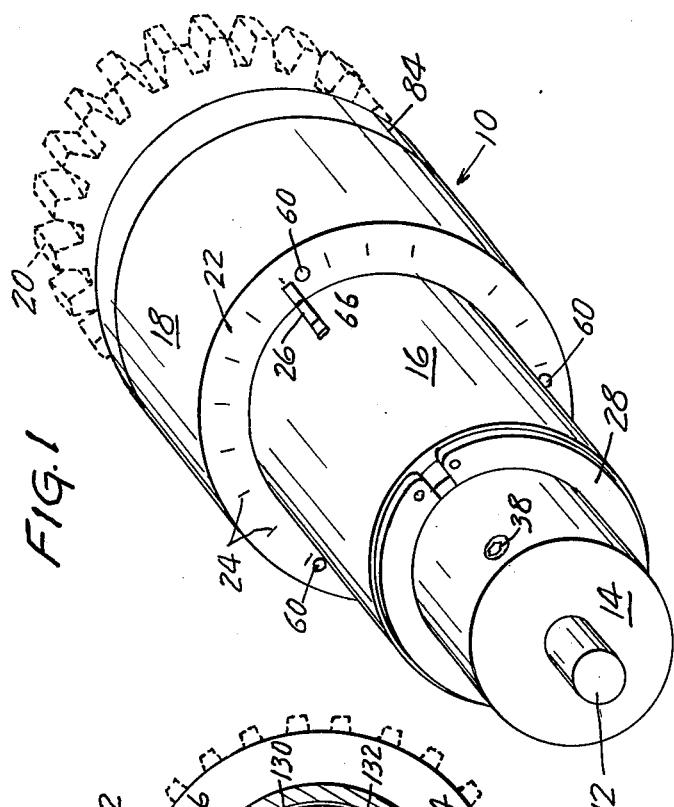

United States Patent [19]
Wahlstedt

[11] 3,877,274
[45] Apr. 15, 1975

[54] TORQUE METER
[75] Inventor: Robert L. Wahlstedt, Minneapolis, Minn.
[73] Assignee: Reel Precision Manufacturing Corporation, St. Paul, Minn.
[22] Filed: Mar. 25, 1974
[21] Appl. No.: 454,479

[52] U.S. Cl. ............................................. 73/136 A
[51] Int. Cl. .................................................. G01l 3/02
[58] Field of Search ...... 73/136 A, 136 B, 1 C, 491, 73/492, 99; 116/129 B

[56] References Cited
UNITED STATES PATENTS

| | | | |
|---|---|---|---|
| 2,133,763 | 10/1938 | Williams | 73/139 X |
| 2,607,219 | 8/1952 | Millard et al. | 73/139 |
| 3,108,472 | 10/1963 | Scyocurka | 73/139 |
| 3,491,579 | 1/1970 | Able | 73/1 C |

Primary Examiner—Charles A. Ruehl

[57] ABSTRACT

A spring-loaded torque meter incorporating a releasable one-way clutch and torque indicator.

6 Claims, 4 Drawing Figures

TORQUE METER

This invention relates to spring-loaded devices useful in measuring torque, i.e. forces which induce or resist rotation. There is provided a self-contained unit which indicates maximum torque load occurring within the system in which it is installed. The unit is useful in determining maximum torque developed under high inertial starting conditions. It is moreover easily re-set while in use, to permit measurement of maximum torque during steady state dynamic operation.

Heretofore, spring-loaded torque control devices have been known which limit transmitted torque to a predetermined maximum; see, for example, U.S. Pat. Nos. 3,124,227, 3,147,834, and 3,301,362. The device of the present invention permits measuring, rather than simply limiting, the amount of torque transmitted.

Figure 3:
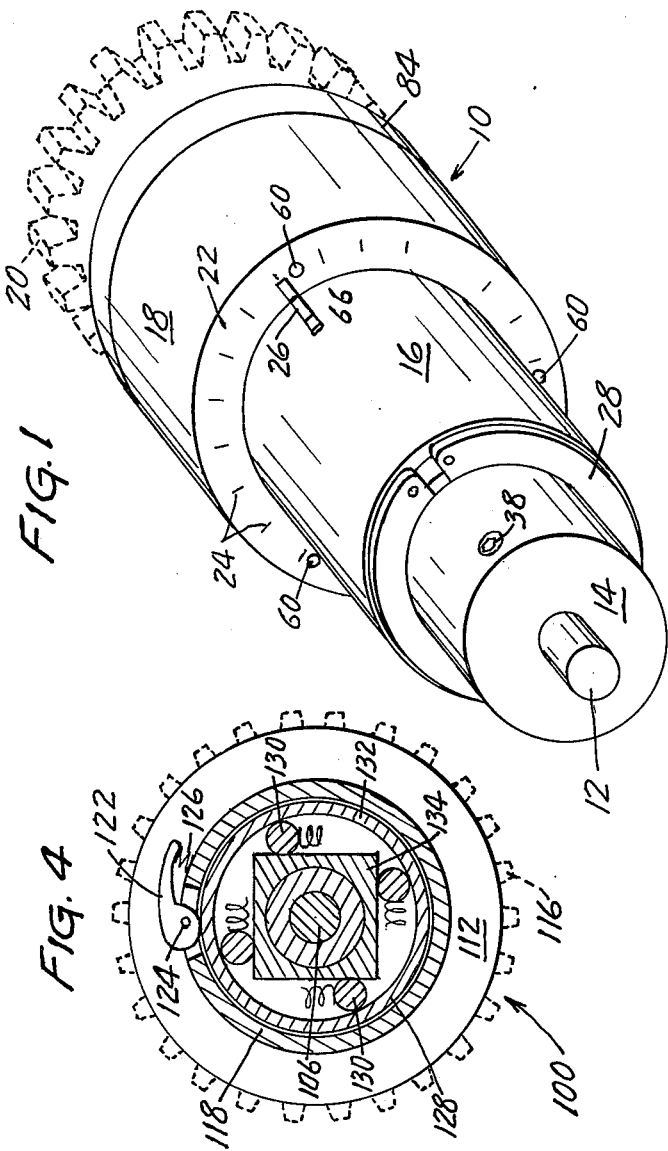
Figure 4:
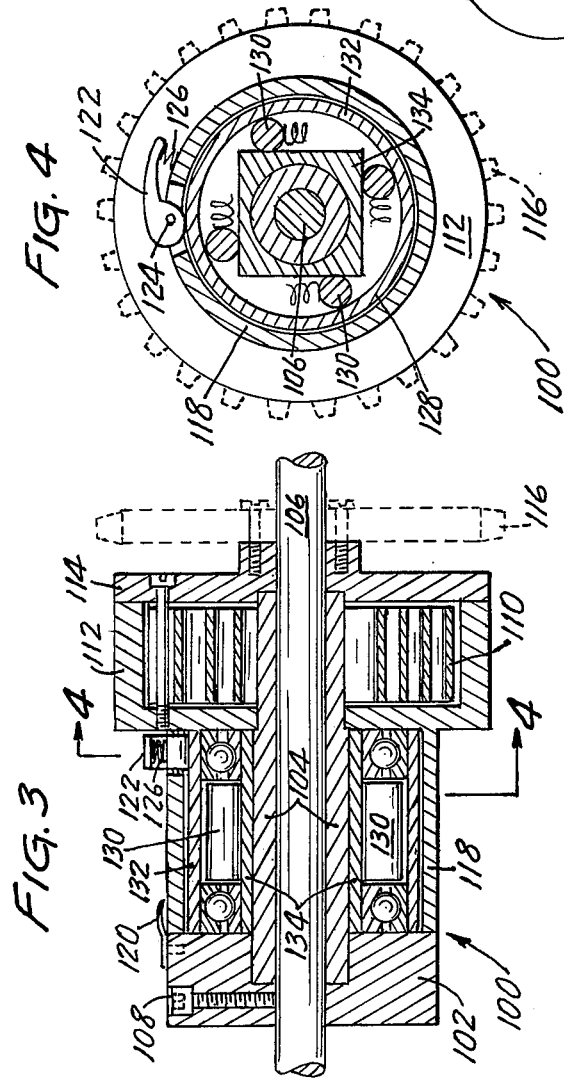
Figure 2:
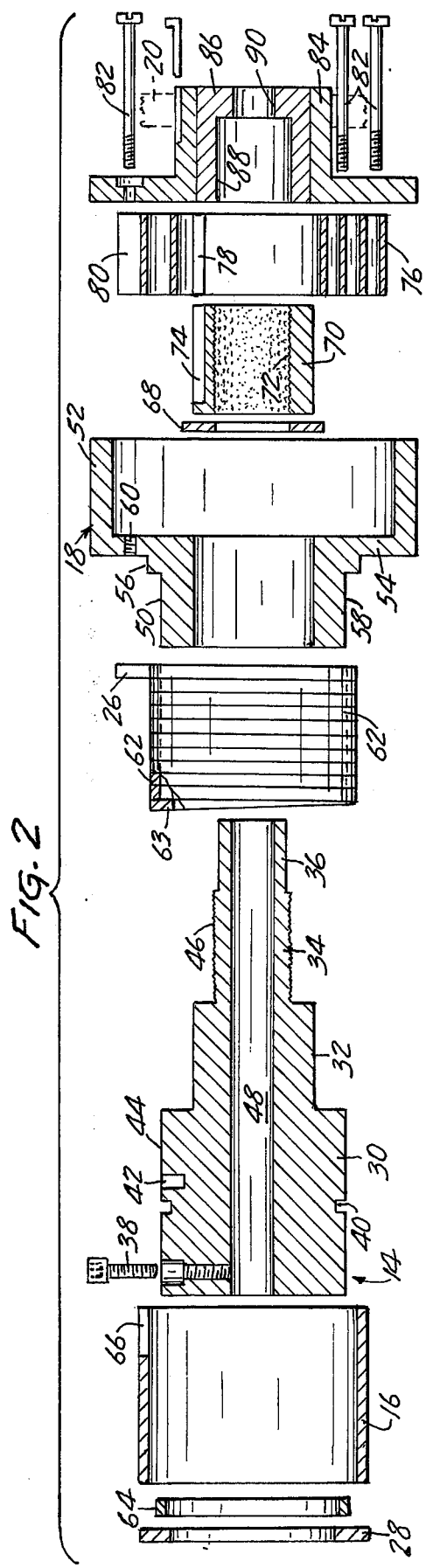

In the drawing,

FIG. 1 is an isometric view of one form of the torquemeter device of the invention, fitted with a power take-off sprocket and installed on a drive shaft, FIG. 2 is an exploded view showing the components of the device of FIG. 1, primarily in longitudinal cross-section, FIG. 3 is a partially schematic longitudinal sectional view of an alternative form of torque meter, and FIG. 4 is a lateral cross-sectional view taken approximately along line 4—4 of FIG. 3.

As shown in FIG. 1, the torque meter 10 is mounted on a drive shaft 12 and includes hub 14, cylindrical cover 16, and housing 18. A sprocket 20 attached to the housing is provided for making connection to a work load. The forward face 22 of the housing carries a scale 24, and a pointer 26 is positioned adjacent the scale. The cover 16 is retained by a ring clip 28.

The several components and their relationships are shown more particularly in FIG. 2. The hub 14 has four sections 30, 32, 34 and 36 of decreasing diameter. Section 30 is drilled and tapped to receive a set-screw 38, is circumferentially grooved at groove 40 to receive the clip 28, is provided with a spring-retaining aperture 42, and has a wear-resistant smooth surface 44. The surface 46 of section 34 is scored or fluted. The central bore 48 is of a diameter to receive the drive shaft 12.

The housing 18 includes a hub section 50, a larger diameter open-ended shell 52, and a connecting web 54 having an extended shoulder 56. The hub 50 rotatively fits over the section 32 of the hub 14 and its smooth wear-resistant outer surface 58 is of identical diameter and hardness with surface 44. The web 54 is drilled and tapped at uniformly distributed locations 60.

A spiral spring 62 fits over the hardened surfaces 44 and 58, being held in place by a radially inturned end 63 fitted into aperture 42. The opposite end extends radially outwardly to form pointer 26. The spring fits snugly about the two hardened surfaces when allowed to relax, but may be opened slightly by force applied tangentially to the pointer to permit relative rotation of hub 14 and housing 18.

A ring 64 fits over the hub section 30 between the groove 40 and the aperture 42. The outer diameter is identical with that of the shoulder 56 of the housing 18. The ring and shoulder serve as supports for the cylindrical cover 16. The latter is slotted at one end to provide a longitudinal slot 66 through which the pointer 26 extends as shown in FIG. 1. The cover is held in place by the clip 28 in the groove 40.

A washer 68 fits over the segment 34 of the hub 14 and between the end of the section 32 and the adjacent end of a wide ring 70. The inner surface 72 of the ring 70 is scored, fluted or otherwise treated to provide for a permanent press fit over the surface 46 of section 34 of the hub 14. The ring is slotted to provide a longitudinal slot 74. The washer 68 aids in retaining the housing 18 in position on the hub section 32 but is not essential, and the ring 70 may likewise be eliminated by increasing the diameter of the hub section 34 and forming the slot 74 directly in said section.

A coil spring 76 connects the hub 14 to the housing 18. An inner radial extension 78 fits within the slot 74 in ring 70; and outer curved or looped extension 80 is engaged by one of the studs 82 which screw into the threaded sockets 60 and hold a faceplate 84 in position over the open face of the housing. The faceplate carries a bushing 86 having an enlarged bore 88 rotatively fitting the hub section 36 and a smaller outer bore 90 rotatively fitting the shaft 12.

Torque is applied to the device through the drive shaft 12 and is transmitted from the device to a load through the spur gear 20 which is attached to the faceplate 84. The application of such load causes rotation of the housing 18 with respect to the hub 14 to an extent permitted by the deflectable coil spring 76. The spiral spring 62 permits such rotation but prevents relative rotation in the reverse direction, so that the maximum torque applied may be easily and accurately determined from the position of the pointer 26 with respect to the scale 24. Initial or starting torque is thus readily measured.

The device also makes possible the determination of torque under steady state operation, and which is frequently substantially lower than under start-up conditions. By simply arresting the rotation of the cover 18 momentarily, e.g. as by grasping the cover between thumb and finger, sufficient force is applied against the pointer 26 to expand the spiral spring 62 and thereby permit partial retraction of the coil spring 76, so that an accurate reading of torque input during continued rotation may be obtained.

An alternative structure employs an overrunning or one-way clutch in place of the spiral spring assembly of the device of FIGS. 1 and 2. As indicated in FIGS. 3 and 4, the device 100 comprises a hub 102 and hub extension 104 which are fastened to the shaft 106 by set-screw 108. A deflectable coil spring 110 connects the hub with a housing 112 having a faceplate 114 rotating on the end of the hub extension 104 and the shaft 106. The faceplate carries a sprocket 116 or is otherwise equipped for transmission of torque. A cylindrical sleeve 118 extends from the other side of the housing 112 to adjacent the hub 102 and carries scale markings (not shown) beneath a pointer 120 carried by the hub. Pivotally attached to the face of the housing within an opening in the sleeve 118 is a cam 122 supported on a pin 124 and biased inwardly by a spring 126. An overrunning clutch assembly, such for example as a "Mini-Clutch" one way ball bearing clutch assembly, fits over the hub extension 104 and within the sleeve 118, and is normally held in place by the cam 122 but may be released by light pressure on the cam lever. Such clutches operate by a wedging action of central rollers 130 between an outer cylinder 132 and an inner sleeve 134 with slanted faces, as somewhat schematically indicated in FIG. 4.

Typically, a torque meter made in accordance with either of the preceding descriptions may be about three and one-half inches in length, have a maximum diameter of slightly less than two inches, fit a quarter inch shaft, and register over a range of zero to 40 inch-pounds of torque.

Bearing surfaces undergoing relative rotation, such for example as the inner surface of the hub 50 of housing 18 and the outer surface of section 32 of hub 14, should have minimal frictional resistance and for that purpose may be provided with friction-resistant coatings or with appropriate bushings or bearings and if necessary with access channels or the like for lubrication.

The devices described hereinabove rely on visual inspection for read-out of power requirements. It will be appreciated that other specific means may be substituted, and in particular that various electrical, mechanical or electronic devices which not only read and record the power requirements but may also be energized to stop the machine upon excessive torque requirements or otherwise to carry out additional operations may likewise be incorporated without departing from the spirit of the invention.

It will also be appreciated that by appropriate selection and arrangement of components the effective direction of rotation of the device, as well as the respective points of application and transmission of torque, may be reversed if desired.

What is claimed is as follows:

1. A device adapted to serve as a torque meter, comprising, in combination: driving means for connection to a source of power; driven means for connection to a load whose resistance to torque is to be measured; said driving and driven means being in axial alignment and including axially adjacent cylindrical surfaces of identical diameter; deflectable coil spring means connecting said driving and driven means for establishing a measurable deflection dependent on said load; releasable lock means, comprising a spiral spring overlying said surfaces and fixed at one end to one of said surfaces, for maintaining said deflection; and readout means for determining the extent of said deflection.

2. Device of claim 1 wherein said spiral spring has a free end serving as a component of said readout means.

3. Device of claim 2 including a rotatable tubular cover loosely fitting about said spiral spring and slotted to receive said free end thereof.

4. A torque meter adapted for determining maximum torque under steady state dynamic conditions, comprising: coaxial drive means for connection to a source of power and driven means for connection to a load whose resistance to torque is to be measured; deflectable spring means connecting said drive and driven means for establishing a measurable angular deflection therebetween dependent on said load; lock means for releasably maintaining said deflection; and readout means for determining the extent of said deflection; and wherein said lock means comprises an expandable spiral spring overlying axially adjacent cylindrical surfaces carried by said drive means and said driven means.

5. A torque meter adapted for determining maximum torque under steady state dynamic conditions, comprising: coaxial drive means for connection to a source of power and driven means for connection to a load whose resistance to torque is to be measured; deflectable spring means connecting said drive and driven means for establishing a measurable angular deflection therebetween dependent on said load; overrunning clutch means coaxial with said drive and driven means, affixed to one of said means and disposed in freely rotating relationship with the other of said means; lock means carried by said other means for releasably locking said clutch means thereto; and readout means for determining the extent of said deflection.

6. Meter of claim 5 wherein said clutch means is affixed to an inner sleeve and disposed within an outer cylinder.

* * * * *